United States Patent [19]

Asanabe et al.

[11] Patent Number: 4,786,264
[45] Date of Patent: Nov. 22, 1988

[54] STERN TUBE BEARING SYSTEM OF CONTRA-ROTATING PROPELLER

[75] Inventors: Sadao Asanabe; Kunio Saki; Susumu Matsumoto; Susumu Taniguchi; Shozo Morohoshi; Masatoshi Koda, all of Nagasaki, Japan

[73] Assignee: Mitsubishi Jukogyo Kabushiki Kaisha, Tokyo, Japan

[21] Appl. No.: 926,623

[22] Filed: Nov. 4, 1986

[30] Foreign Application Priority Data

Nov. 8, 1985 [JP] Japan .................................. 60-250471
Apr. 4, 1986 [JP] Japan .............................. 61-50694[U]

[51] Int. Cl.$^4$ .............................................. B63H 23/34
[52] U.S. Cl. ..................................... 440/83; 416/129; 184/6
[58] Field of Search ................ 440/75, 81, 83; 184/6; 416/124, 128, 129, 127

[56] References Cited

U.S. PATENT DOCUMENTS 2,457,999  1/1949  Hulbert ............................... 416/129
2,470,560  5/1949  Hoover ................................ 416/127

Primary Examiner—Sherman D. Basinger
Assistant Examiner—Jesûs D. Sotelo
Attorney, Agent, or Firm—Wenderoth, Lind & Ponack

[57] ABSTRACT

A stern tube bearing system of contra-rotating propeller includes an inner shaft having a rear propeller and an outer shaft having a front propeller, both shafts being rotated in opposite directions. A shaft center portion of the inner shaft is made hollow, a plurality of oil supply holes are bores radially in the inner shaft so as to pass therethrough perpendicularly to the outer peripheral surface thereof, and a plurality of rows of these oil supply holes are arranged in the longitudinal direction of the inner shaft, whereby seizing of the bearing owing to offset contact at its rear end caused by the propeller being overhung can be prevented.

7 Claims, 9 Drawing Sheets

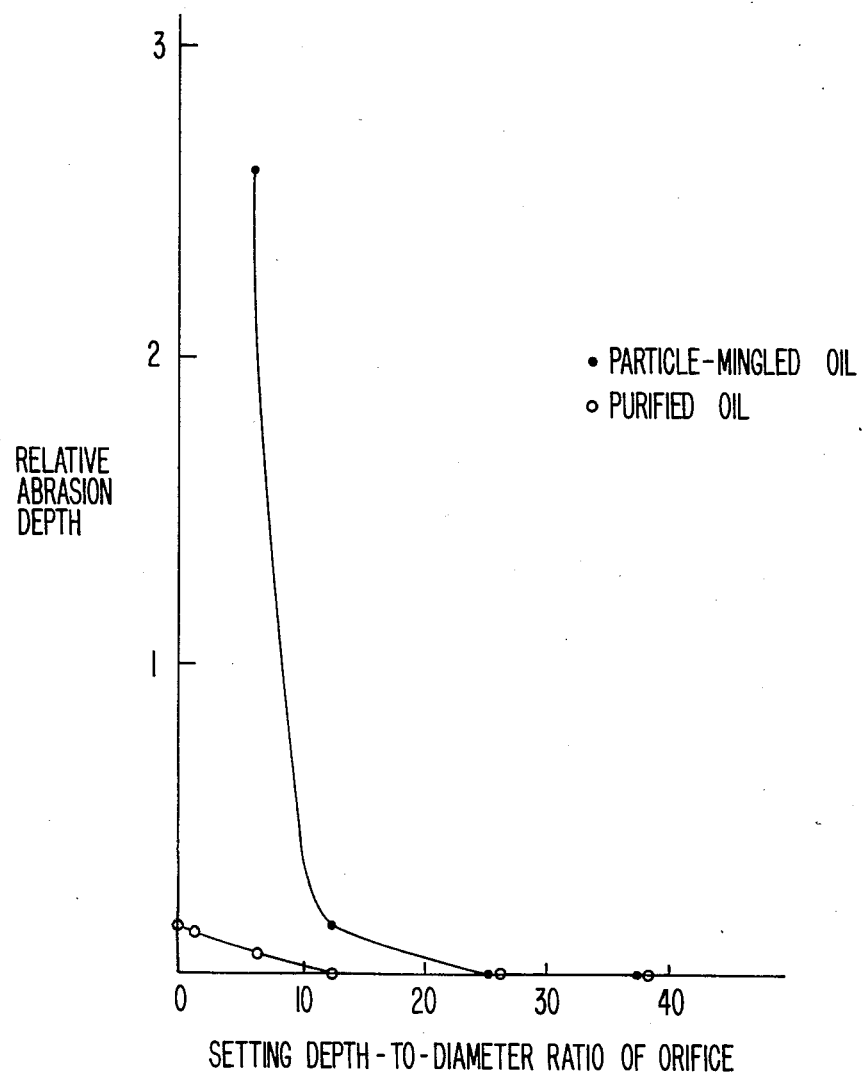

STERN TUBE BEARING SYSTEM OF CONTRA-ROTATING PROPELLER

BACKGROUND OF THE INVENTION

1. Field of the Invention

This invention relates to a stern tube bearing system of contra-rotating propeller for large-size marine vessels.

2. Description of the Prior Art

FIGS. 14 through 18 show conventional stern tube bearing systems of contra-rotating propeller.

Referring to these drawings, marine vessels employing conventional contra-rotating propeller systems use the well-known vessel-propulsion method in which an inner shaft 02 having at its point a rear propeller 01 and an outer shaft 04 having at its point a front propeller 03 are rotated in opposite directions via a reversing device by a prime mover not shown (such as diesel engine, steam turbine, or gas turbine). To drive propeller shafts smoothly, generally, a front bearing 06 and a rear bearing 07 are disposed between the outer shaft 04 and a hull 05, and a reversing front bearing 08 and a reversing rear bearing 09 are disposed between the inner shaft 02 and the outer shaft 04. Further, between the hull and the outer shaft and between the outer shaft and the inner shaft are disposed stern shaft seals 010 and 011, respectively, in a stern section.

The bearing disposed between the outer shaft 04 and the hull 05 is the ordinary type of stern tube bearing and has no peculiar technical difficulty. However, because the inner shaft 02 and the outer shaft 04 rotate in opposite directions, the bearing incorporated therebetween is confronted with some technical difficulties. The reasons are as follows.

FIG. 15 is a schematic cross-sectional view showing the mode of counter-rotation as viewed in the axial direction. Because the hull remains stationary, a normal fluid lubrication plain bearing is formed between the outer shaft 04 and the hull 05. However, because the inner shaft 02 and the outer shaft 04 are rotating in opposite directions as indicated by the arrows, fluid lubrication can hardly be achieved therebetween. Further, when the above two are rotating in opposite directions substantially at the same velocity, fluid lubrication (separation of the shafts by means of oil film) cannot be effected.

To cope with the aforementioned difficulty, such bearing systems as shown in FIGS. 16 and 17 were proposed in the prior art. The system of FIG. 16 is characterized in that a floating bushing 012 is disposed between the inner shaft 02 and the outer shaft 04 and held substantially stationary to form fluid lubrication oil films between the inner shaft and the floating bushing and between the floating bush and the outer shaft. FIG. 17 shows an outer shaft 013 having taper/land portions on its inner surface, that is, section A indicates a taper portion, B a land portion parallel to the surface of the inner shaft, and C a dynamic pressure generating taper portion effective when the whole system reverses (goes astern).

The conventional bearing system creates easily the fluid lubrication oil film (the dynamic pressure). However, if the marine vessel is running at a low speed, which arises during the service of the vessel, the oil film becomes thin as a result, metal-to-metal contact tends to occur on the bearing surface, and a rear end portion of the bearing 09 tends to cause offset contact as shown in FIG. 18 because of the propeller being overhung; thus, there is the problem that the bearing will seize.

SUMMARY OF THE INVENTION

It is an object of the present invention to overcome the aforementioned problems by providing a bearing system which permits operation at even lower speeds in view of the demand for making large propellers, and for enhancing the propulsion efficiency thereof. The invention prevents seizing of a rear end portion of the bearing even under offset contact that will be caused because of the propeller being overhung.

To achieve the foregoing object, the present invention provides a stern tube bearing system of a contrarotating propeller of the type wherein an inner shaft having a rear propeller and an outer shaft having a front propeller are rotated in opposite directions. A novel characteristic is that a shaft center portion of the inner shaft is made hollow, a plurality of oil supply holes are bored radially in the inner shaft so as to pass therethrough perpendicularly to the outer peripheral surface thereof, and a plurality of rows of these oil supply holes are arranged in the longitudinal direction of the inner shaft.

According to the foregoing structure, by letting h denote the thickness of an oil film at an oil supply hole, $P_o$ the outlet pressure of the oil supply hole, and $P_s$ the oil pressure inside the hollow portion of the inner shaft; a run-out flow rate Q toward the bearing is represented by $Q \alpha h_s P_s$, and a flow rate Q passing through the oil supply hole (equivalent to the run-out flow rate from the bearing) is represented by $Q \alpha \sqrt{P_s - P_o}$.

As will be apparent from the aforementioned relationships, the larger the h, the smaller the $P_o$. Conversely, the smaller the h, the larger the $P_o$. Accordingly, by determining the distribution of static pressure in the longitudinal direction of the bearing section at the oil supply holes, it is possible to develop a static pressure, i.e. a load carrying capacity, acting so as to lift the weight of the inner shaft.

BRIEF DESCRIPTION OF THE DRAWINGS

FIG. 13 is a graph of experimental results that is illustrative of the influence of setting depth of an orifice on the abrasion depth of a bearing metal;

FIGS. 14 through 18 show conventional stern tube bearing systems of contra-rotating propellers, in which FIG. 14 is a sectional side view of a stern bearing section;

FIG. 15 is a cross-sectional view of a contra-rotating bearing system;

FIGS. 16 and 17 are cross-sectional views of other contra-rotating bearing system; and FIG. 18 is a sectional side view corresponding to FIG. 14, showing the state in which both inner and outer shaft bearings are causing offset contact because of the propeller being overhung.

DESCRIPTION OF THE PREFERRED EMBODIMENTS

Embodiments of the present invention will now be described with reference to FIGS. 1 through 13.

Figure 1:
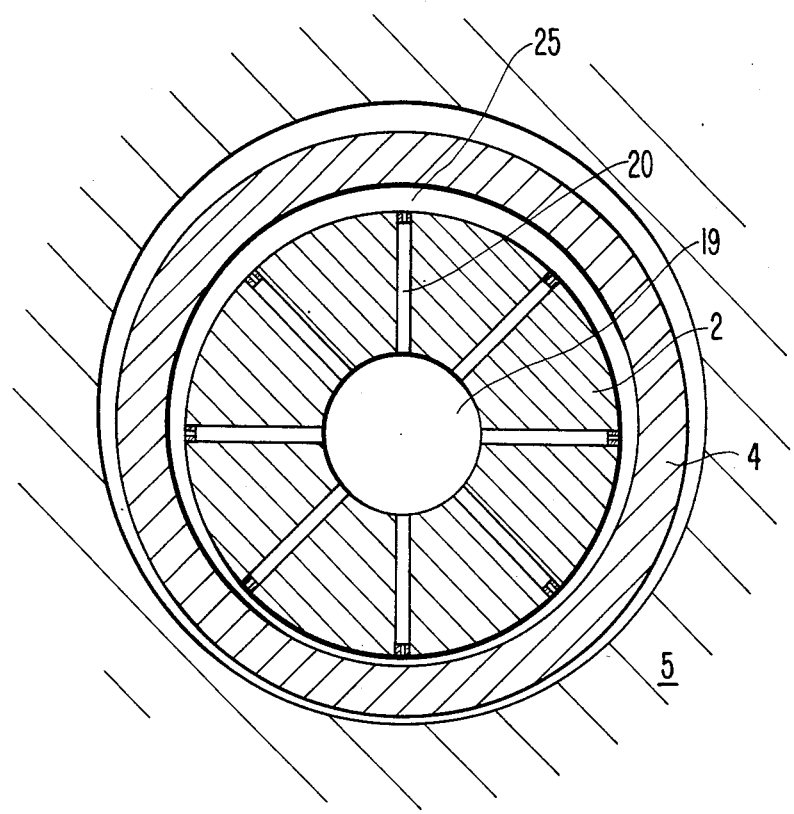
FIG. 1 is a cross-sectional view showing a first embodiment of a stern tube bearing system of contrarotating propeller according to the present invention.
Figure 3:
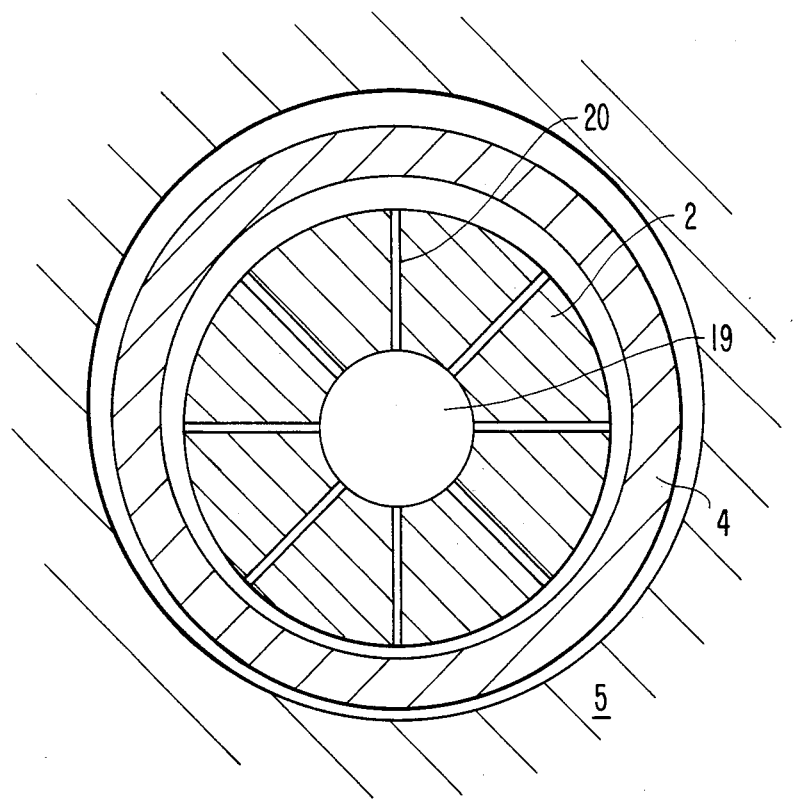
FIG. 3 is a cross-sectional view showing a second embodiment of the present invention.

In FIG. 1 showing a first embodiment, an outer shaft 4 and an outer shaft bearing 5 are identical to those of the conventional system. But, the system of FIG. 1 differs in that an inner shaft 2 has a concentric hole 19 concentrical with the outer periphery thereof for leading an oil pressure supplied form a hydraulic power source not shown, which hole communicates with three or more radial holes 20 bored radially in the inner shaft. An outer peripheral portion of each radial hole 20 has a screw 25 tightened therein which has a pinhole having the orifice-throttling function, and each outer peripheral portion is finished so as to assume the same circumference as of the outer periphery of the inner shaft. In FIG. 3 showing a second embodiment, an outer shaft 4 and an outer shaft bearing 5 are identical to those of the first embodiment. But, the system of FIG. 3 differs in that an inner shaft 2 has, as three or more radial holes 20 communicating with the oil pressure leading concentric hole 19, holes having the capillary-throttling function.

Figure 2A:
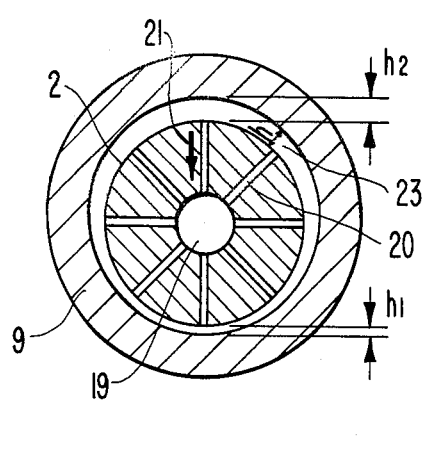
FIG. 2(A) is a diagram explanatory of the operation principle of the system shown in FIG. 1.

The operation principle of the foregoing first and second embodiment will now be described with reference to FIGS. 2(A) and (B). Referring to FIG. 2(A), consider a peripheral spot 23 of one, where the oil film has a thickness of h, among a number of radial holes 20 of the inner shaft. By letting $P_o$ denote the outlet pressure of the radial hole 20, and $P_s$ the supply pressure of the concentric hole 19, a run-out flow rate Q toward the bearing is represented by $Q \alpha h_s P_o$.

Further, a flow rate Q passing through the hole or orifice (equivalent to the run-out flow rate from the bearing) is represented by $Q \alpha \sqrt{P_s - P_o}$.

Figure 2B:
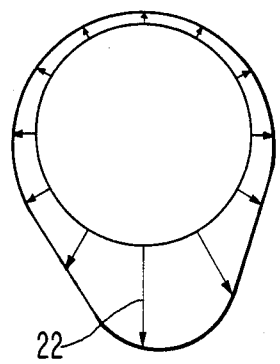
FIG. 2(B) is a diagram illustrative of the distribution of static pressure corresponding to FIG. 2(A)

As will be apparent from the aforementioned relationships, the larger the h, the smaller the $P_o$. Conversely, the smaller the h, the larger $P_o$. Accordingly, the distribution of static pressure around the inner shaft in case a number of radial holes 20 are provided is not uniform about the shaft center (as shown in FIG. 2(B)). Thus, there is produced a static pressure; i.e. a load carrying capacity, acting so as to lift the weight 21 of the inner shaft.

Of course, a similar action to that of the orifice is also realized in case of capillary throttling. In FIG. 2(A), $h_1$ and $h_2$ indicate the minimum and the maximum thickness of the soil film, respectively.

Figure 4:
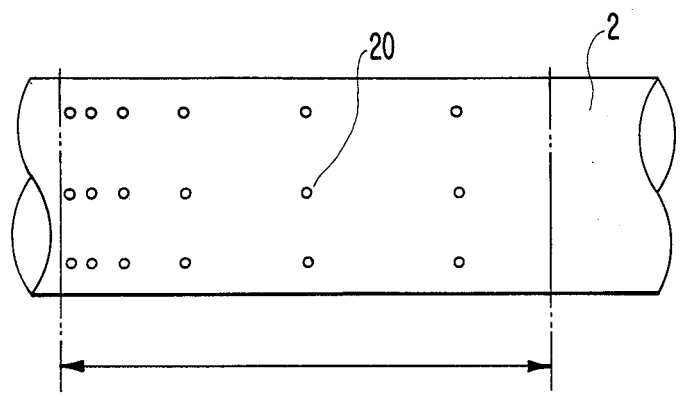
FIG. 4 is a side view of an inner shaft as shown in FIG. 1 or FIG. 3.
Figure 5:
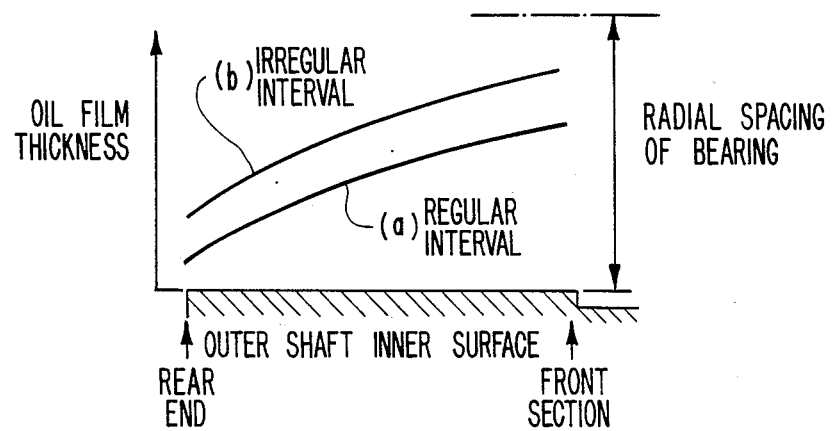
FIG. 5 is a diagram explanatory of the effect obtained by the inner shaft of FIG. 4.
Figure 14:
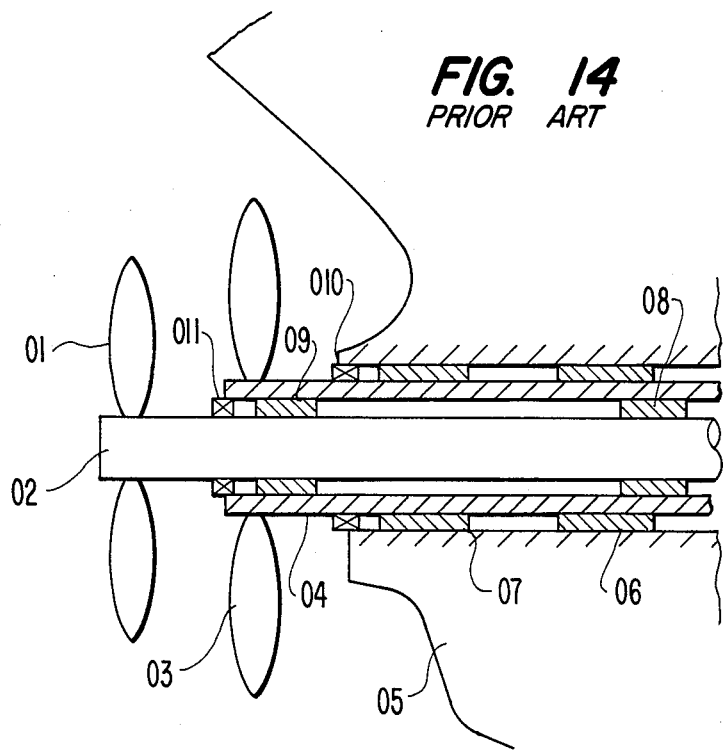
Figure 6:
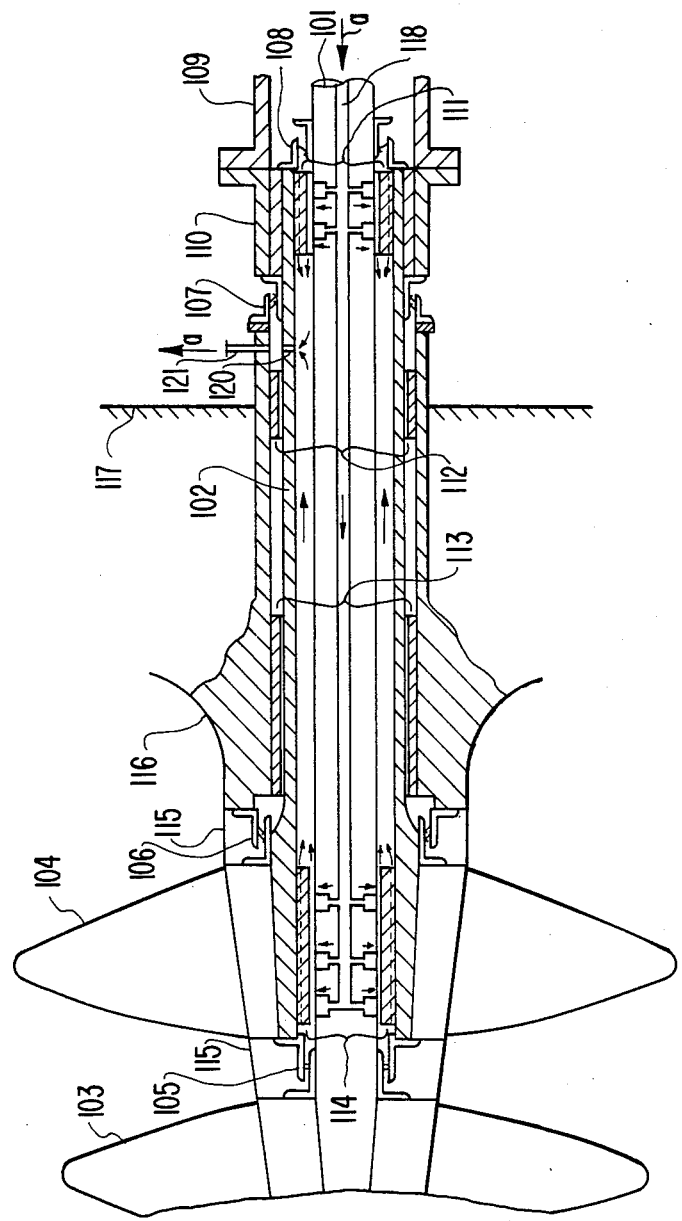
FIG. 6 is a longitudinal sectional view showing a stern shaft system in a third embodiment of the present invention.
Figure 7:
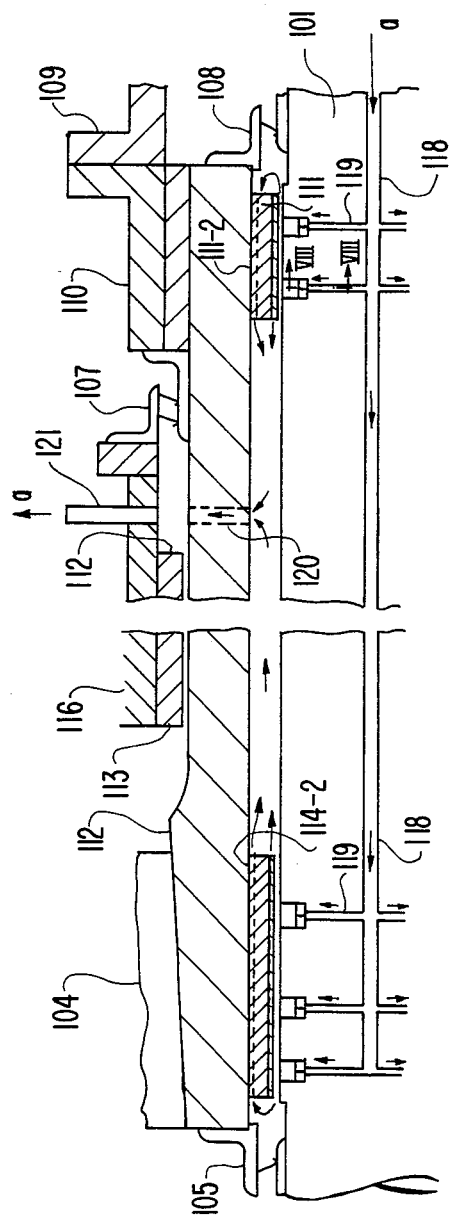
FIG. 7 is a fragmentary enlarged sectional view corresponding to FIG. 6.

FIG. 4 shows in side view the inner shaft as shown in FIG. 1o FIG. 3. The radial holes 20 are arranged in the longitudinal direction of the inner shaft 2 at irregular intervals, and the spacing between adjacent holes becomes small as approaching the stern. Of course, the area where the holes are arranged is limited to the extent of of the width (the length) of the bearing. Describing the function and effect of the foregoing arrangement with reference to FIG. 5, if the static pressure holes are arranged at regular intervals, a rear end section of the shaft has a minimal oil film, whereas a front section leaves a large space; as a result, a great amount of wasteful oil is consumed through the static pressure holes of the front section.

Thus, if the holes are provided at irregular and closely-spaced intervals in an area of the rear end section where offset touch is heavy, the extent of rising of the shaft in the rear end section can be made large while remarkably reducing the necessary amount of oil in comparison with an arrangement having regular intervals. Of course, in cases where the inclination of the shaft is small or consumption of oil does not matter, the holes may be provided at regular intervals.

As described above, the following effects are produced by application of the stern tube bearing system of contra-rotating propeller according to the present invention:

(1) Low-speed operation is permitted, whereby the propeller can be enlarged and the propulsion efficiency can be enhanced; and (2) There occurs no seizing due to offset contact of a rear end portion of the bearing that would be caused because the propeller is overhung.

FIGS. 6 through 12 show a third embodiment of the present invention and modifications.

In these drawings, reference numeral 101 designates an inner shaft; 102 an outer shaft; 103 a rear propeller; 104 a front propeller; 105, 106, 107 and 108 seal members; 109 a two-piece hollow shaft; 110 a coupling of the outer shaft; 111 an inner shaft bearing on the stem side; 112 an outer shaft bearing on the stem side; 113 an outer shaft bearing on the stern side; 114 an inner shaft bearing on the stern side; 115 a lobe guard; 116 a hull; 117 a rear bulkhead of an engine room; 118 an oil feeding hole for passing therethrough an oil a of high pressure; 119 an oil supply hole formed radially in the inner shaft 101; 120 an oil drain hole formed in the outer shaft; 121 a lubricating oil outlet pipe; 114-1 a bearing metal applied to the inner shaft bearing 114 on the stern side; and 114-2, 114-3, 114-4 and 114-5 oil drain holes formed in either or both of the outer peripheral surface of the inner shaft bearing 114 and the inner peripheral surface of the outer shaft 102 for making communication between both ends of the inner shaft bearing.

Of course, the inner shaft bearing 111 on the stem side also has a bearing metal and oil drain holes.

The inner shaft 101 is linked to a propelling prime mover not shown and drives the rear propeller 103. The outer shaft 102 is rotated by a reversing device or a second propelling prime mover not shown in the opposite direction to the rotation of the inner shaft 101 to drive the front propeller 104.

To lubricate the inner and outer shaft bearings 111, 112, 113 and 114, a lubricating oil of high pressure is supplied from a hydraulic power source not shown to the oil feeding hole 118 which is formed in a shaft center portion and extends in the axial direction of the inner shaft 101 for driving the rear propeller 103. This lubricating oil coming through the oil feeding hole 118 passes through the oil supply holes 119 formed radially in the inner shaft 101 to lubricate the inner shaft bearings 111 and 114; after lubrication the drain oil goes directly, or after passing through the oil drain holes 111-2 and 114-2 formed in the outer peripheral sections of the inner shaft bearings 111 and 114, to the oil drain hole 120 bored in the outer shaft 102, lubricates the outer shaft bearings 112 and 113, and returns through the lubricating oil outlet pipe 121 to the hydraulic power source.

Figure 12:
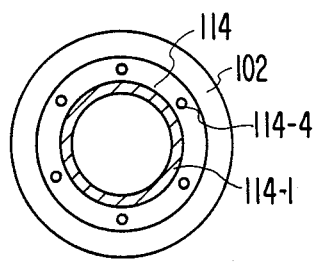
Figure 11:
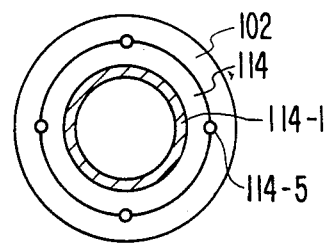
Figure 15:
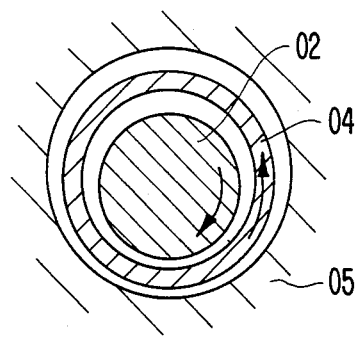
Figure 16:
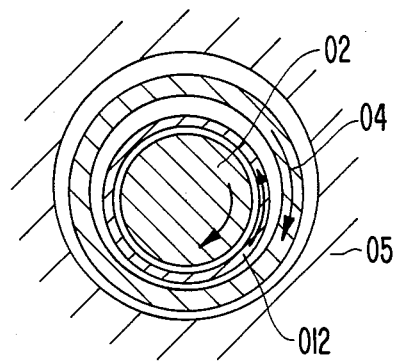
Figure 17:
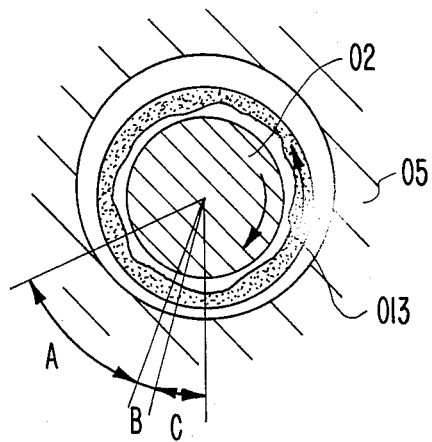
Figure 18:
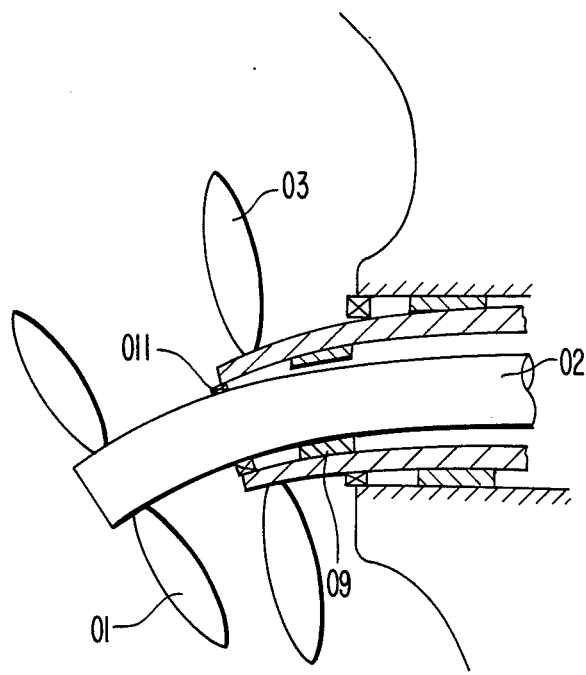

Examples of the oil drain hole are shown in FIGS. 9 through 12, in which FIG. 12 shows those passing through the insides of the inner shaft bearings 111 and 114.

Figure 8:
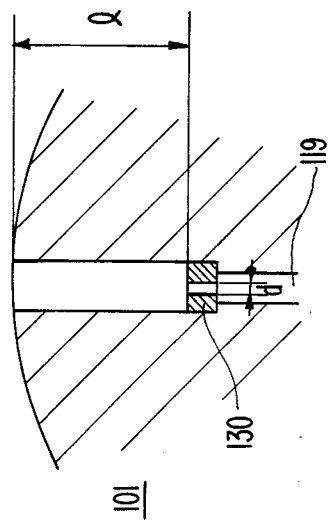
FIG. 8 is a fragmentary sectional view of an inner shaft taken in the direction of the arrows along line VIII—VIII in FIG. 7.
Figure 9:
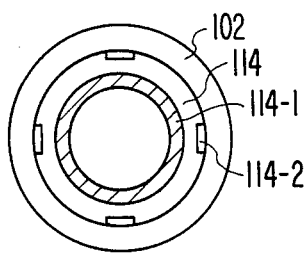
FIGS. 9 through 12 are cross-sectional views showing other embodiments of the bearing system according to the present invention.
Figure 10:
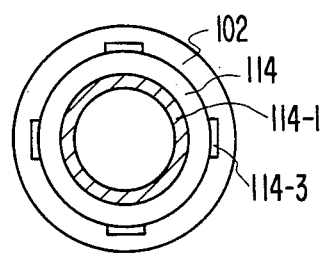

To adjust the supply amount of oil to the inner shaft bearings 111 and 114, each oil supply hole 119 has an orifice 130 or a fluid throttling element (hereinafter referred to simply as an orifice) having the same function as that of the orifice as shown in FIG. 8. The manner of determining the setting depth of the orifice will be described below.

The setting depth of the orifice is determined on the basis of the results of collision erosion test that was performed by causing the lubricating oil flowing out from the orifice 130 to collide with the bearing metal 114-1 applied to the inner peripheral surfaces of the inner shaft bearings 111 and 114 and the like.

As shown in FIG. 13, if the ratio, l/d (see FIG. 8), of setting depth to diameter d of the orifice 130 is small, abrasion owing to erosion cannot be avoided even in case of purified oil. In case solid particles are mingled, the extent of abrasion increases abruptly as shown in FIG. 13. However, if the ratio l/d is increased the amount of abrasion decreases remarkably, and in the range of $l/d > 25$, substantially zero abrasion is exhibited.

In this way, by providing the orifice 130 at the position of the oil supply hole 119 as proposed by the present invention, irrespective of amount of solid particles mingled in the lubricating oil, the bearing metal provided on the inner peripheral surface of the inner shaft bearing 111, 114 cannot be damaged by erosion.

As described above, the third embodiment is characterized in that the inner shaft bearing is attached to the inner peripheral surface of the outer shaft, which has the bearing metal on its inner peripheral surface, a plurality of oil drain holes are formed in the outer peripheral surface of the inner shaft bearing being in contact with the outer shaft or in the inner peripheral surface of the outer shaft for making communication in the axial direction between both ends of the inner shaft bearing, and the orifice for adjusting the supply amount of oil or fluid throttling element having the same function as that of the orifice, having a diameter d, is provided in each oil supply hole with a setting depth l under the condition that $l/d > 25$.

Thus, the following effects are produced:

(1) After performing lubrication of the bearings, the lubricating oil passes through the oil drain holes formed in either or both of the outer peripheral surface of the inner shaft bearing and the inner peripheral surface of the outer shaft, and is drained smoothly; thus, even when the sliding surfaces of the inner and outer shafts cause metal-to-metal contact by any chance, the bearing metal can can assuredly be protected from destructive damage; and (2) Because the setting depth of the orifice and the like provided in the radial oil supply hole of the inner shaft is made larger than is necessary, there is no erosion in the bearing metal that would otherwise be caused by a jet flow of the lubricating oil of high pressure.

While the preferred embodiments have been described, it is not intended to have the present invention limited to the specific embodiments thereof, and many changes and modifications may be made without departing from the spirit of the present invention.

What is claimed is:

1. A stern tube bearing system in a contra-rotating propeller device of the type in which an inner shaft having a rear propeller and an outer shaft having a front propeller are rotated in opposite directions, said stern tube bearing system comprising the inner shaft having a substantially central longitudinal bore therein for supplying pressurized oil therethrough; and a plurality of oil supply holes extending from said longitudinal bore to the outer surface of said inner shaft, and opening thereat, said plurality of oil supply holes being spaced radially around said inner shaft and being spaced longitudinally along said inner shaft, said plurality of oil supply holes directing the pressurized oil supplied into said longitudinal bore outwardly of said inner shaft for establishing an oil bearing film adjacent the outer surface of said inner shaft.

2. A stern tube bearing system as in claim 1, further comprising fluid throttling means located in each oil supply hole of said plurality of oil supply holes, each said fluid throttling means having a flow path therein.

3. A stern tube bearing system as in claim 2, wherein each said throttling means is positioned in its respective oil supply hole under the condition that $l/d > 25$, where l is the distance from the position of each fluid throttling element to the outer peripheral surface of the inner shaft, and d is the diameter of the flow path in each fluid throttling element.

4. A stern tube bearing system as in claim 3, further comprising the outer shaft surrounding said inner shaft, an inner shaft bearing between said outer shaft and said inner shaft having bearing metal on the inner surface thereof and being located radially outwardly of the openings of said plurality of longitudinal bores at the outer surface of said inner shaft.

5. A stern tube bearing system as in claim 4, further comprising a plurality of oil drain holes in the outer peripheral surface of the inner shaft bearing for returning oil from said plurality of oil supply holes to said central longitudinal bore.

6. A stern tube bearing system as in claim 4, further comprising a plurality of oil drain holes in the inner peripheral surface of said outer shaft for returning oil from said oil holes to said central longitudinal bore.

7. A stern tube bearing system as in claim 4, further comprising a plurality of oil drain holes in the outer peripheral surface of said inner shaft bearing and in the inner peripheral surface of said outer shaft.

* * * * *